(12) United States Patent
Yamada et al.

(10) Patent No.: US 10,967,663 B2
(45) Date of Patent: Apr. 6, 2021

(54) PRINTING INTAGLIO, PRINTING INTAGLIO MANUFACTURING METHOD, PRINT-MAKING METHOD, AND PRINT

(71) Applicant: SHARP KABUSHIKI KAISHA, Sakai (JP)

(72) Inventors: Nobuaki Yamada, Sakai (JP); Kenichiro Nakamatsu, Sakai (JP); Hidekazu Hayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 318 days.

(21) Appl. No.: 16/066,649

(22) PCT Filed: Dec. 16, 2016

(86) PCT No.: PCT/JP2016/087569
§ 371 (c)(1),
(2) Date: Jun. 27, 2018

(87) PCT Pub. No.: WO2017/115670
PCT Pub. Date: Jul. 6, 2017

(65) Prior Publication Data
US 2019/0152244 A1 May 23, 2019

(30) Foreign Application Priority Data
Dec. 28, 2015 (JP) .............................. JP2015-256727

(51) Int. Cl.
*B41N 3/00* (2006.01)
*B41C 1/02* (2006.01)
(Continued)

(52) U.S. Cl.
CPC ................ *B41M 3/14* (2013.01); *B41M 1/10* (2013.01); *B41N 1/06* (2013.01); *B41N 3/003* (2013.01); *B42D 25/29* (2014.10); *B42D 25/30* (2014.10); *B42D 25/324* (2014.10); *B42D 25/40* (2014.10); *G02B 1/118* (2013.01); *G07D 7/12* (2013.01);
(Continued)

(58) Field of Classification Search
CPC ................................ B41N 3/003; B41C 1/025
See application file for complete search history.

(56) References Cited

U.S. PATENT DOCUMENTS 6,359,735 B1 3/2002 Gombert et al.
2003/0205475 A1 11/2003 Sawitowski
(Continued)

FOREIGN PATENT DOCUMENTS

JP 2001-517319 A 10/2001
JP 2003-531962 A 10/2003
(Continued)

*Primary Examiner* — Jennifer E Simmons
(74) *Attorney, Agent, or Firm* — ScienBiziP, P.C.

(57) ABSTRACT

A printing intaglio (100A), (100B) is a printing intaglio for use in intaglio printing, the printing intaglio having a surface which has a plurality of first recessed portions (12) that form a pattern to be printed, wherein at least one of the plurality of first recessed portions has a plurality of minute recessed (Continued)

portions (16p) inside the first recessed portion, and when viewed in a direction normal to the surface of the printing intaglio, a two-dimensional size of the plurality of minute recessed portions is not less than 10 nm and less than 500 nm.

15 Claims, 9 Drawing Sheets

(51) Int. Cl.
| | |
|---|---|
| *B41M 3/14* | (2006.01) |
| *B41M 1/10* | (2006.01) |
| *G07D 7/12* | (2016.01) |
| *B42D 25/324* | (2014.01) |
| *B41N 1/06* | (2006.01) |
| *B42D 25/40* | (2014.01) |
| *B42D 25/30* | (2014.01) |
| *B42D 25/29* | (2014.01) |
| *G02B 1/118* | (2015.01) |
| *B41M 3/00* | (2006.01) |
| *B41M 7/00* | (2006.01) |

(52) U.S. Cl.
CPC .............. *B41C 1/025* (2013.01); *B41M 3/003* (2013.01); *B41M 7/0081* (2013.01)

(56) References Cited

U.S. PATENT DOCUMENTS

| | | | |
|---|---|---|---|
| 2005/0072326 A1* | 4/2005 | Braun | B41N 1/06 101/170 |
| 2007/0159698 A1 | 7/2007 | Taguchi et al. | |
| 2009/0034082 A1* | 2/2009 | Commander | G02B 27/60 359/619 |
| 2010/0084851 A1* | 4/2010 | Schilling | B42D 25/29 283/91 |
| 2011/0003121 A1* | 1/2011 | Tsuda | G02B 1/118 428/156 |
| 2012/0318772 A1 | 12/2012 | Minoura et al. | |
| 2013/0182300 A1* | 7/2013 | Muller | B42D 25/373 359/2 |
| 2015/0140154 A1 | 5/2015 | Isurugi et al. | |

FOREIGN PATENT DOCUMENTS

| | | |
|---|---|---|
| JP | 3820476 B2 | 9/2006 |
| JP | 5358858 B2 | 12/2013 |
| JP | 2015-037844 A | 2/2015 |
| WO | 2006/059686 A1 | 6/2006 |
| WO | 2011/125486 A1 | 10/2011 |
| WO | 2013/183576 A1 | 12/2013 |

* cited by examiner (a)

(b)

(c)

(d)

(a)

(b)

(c)

(a)

(b)

(c)

(d)

(e)

(a)

(b)

(c)

(d)

(e)

(f)

(a)

(b)

(c)

(d)

(a)

(b)

(c)

(d)

(e)

PRINTING INTAGLIO, PRINTING INTAGLIO MANUFACTURING METHOD, PRINT-MAKING METHOD, AND PRINT

TECHNICAL FIELD

The present invention relates to a printing intaglio for use in intaglio printing, a method for manufacturing a printing intaglio, a method for producing a printed material, and a printed material.

BACKGROUND ART

Banknotes, securities, personal identification certificates (e.g., passport), and labels and warranty cards for brand name products are required to deter counterfeiting and that can be easily authenticated. For example, it is well known that banknotes have holograms and/or watermarks or have various other features, such as being produced by intaglio printing which is capable of printing fine lines. For example, Patent Documents 1 and 2 disclose an intaglio-printed material which has an anti-counterfeiting effect and which can be easily authenticated and an authentication method (also referred to as "authenticity determination method" or "authenticity discrimination method") for the intaglio-printed material.

In recent years, in the field of anti-counterfeiting techniques (including techniques oriented to deterring of counterfeiting and easy authentication (the same applies to the following description)), application of an antireflection technique which utilizes the principles of a so-called moth-eye structure has been studied. The antireflection technique which utilizes the principles of the moth-eye structure includes forming over a substrate surface a microscopic uneven pattern in which the interval of recessed portions or raised portions is not more than the wavelength of visible light ($\lambda$=380 nm to 780 nm). See Patent Documents 4 to 6. The refractive index for light that is incident on the substrate is continuously changed along the depth direction of the recessed portions or raised portions, from the refractive index of a medium on which the light is incident to the refractive index of the substrate, whereby reflection of the visible light band, for example, is suppressed. Applying such a moth-eye structure and its optical characteristics to anti-counterfeiting techniques has been studied.

Patent Document 3 discloses a security sheet that can be authenticated (including, for example, polymer banknote) which has a moth-eye structure and an authentication method of the security sheet. The security sheet of Patent Document 3 has a multilayer structure consisting of a base layer which is made of a transparent resin and a printing layer in which characters, symbols, figures, and the like, are printed. The security sheet has a window in part of the printing layer, and a film which has a moth-eye structure over its surface is further provided so as to overlap the window. It is disclosed that, due to the optical characteristics of the moth-eye film, the security sheet can be authenticated, and hence, counterfeiting of the security sheet can be prevented. It is also disclosed that it can be determined by observing the window whether or not the security sheet of Patent Document 3 is a counterfeit.

CITATION LIST

Patent Literature

Patent Document 1: Japanese Patent No. 3820476
Patent Document 2: Japanese Patent No. 5358858
Patent Document 3: Japanese Laid-Open Patent Publication No. 2015-37844
Patent Document 4: Japanese PCT National Phase Laid-Open Publication No. 2001-517319
Patent Document 5: Japanese PCT National Phase Laid-Open Publication No. 2003-531962
Patent Document 6: WO 2006/059686
Patent Document 7: WO 2011/125486
Patent Document 8: WO 2013/183576

SUMMARY OF INVENTION

Technical Problem

The security sheet of Patent Document 3 needs formation of another layer (film) which has a moth-eye structure over its surface in addition to the printing layer. In providing the layer which has a moth-eye structure over its surface on the printing layer, misalignment with respect to the printing layer can occur. The security sheet of Patent Document 3 has such a problem that its production yield can decrease due to addition of the anti-counterfeiting effect and/or authenticatability to the security sheet.

The present invention was conceived for the purpose of solving the above-described problems. One major object of the present invention is to provide a printing intaglio which is capable of producing a printed material which is capable of deterring of counterfeiting and/or which can be easily authenticated while suppressing decrease of the production yield, a method for manufacturing such a printing intaglio, a method for producing a printed material using such a printing intaglio, and a printed material.

Solution to Problem

A printing intaglio of an embodiment of the present invention is a printing intaglio for use in intaglio printing, the printing intaglio having a surface which has a plurality of first recessed portions that form a pattern to be printed, wherein at least one of the plurality of first recessed portions has a plurality of minute recessed portions inside the first recessed portion, and when viewed in a direction normal to the surface of the printing intaglio, a two-dimensional size of the plurality of minute recessed portions is not less than 10 nm and less than 500 nm. The two-dimensional size of the plurality of minute recessed portions may be not less than 100 nm and not more than 200 nm.

In one embodiment, the at least one first recessed portion includes a porous alumina layer, and the porous alumina layer has the plurality of minute recessed portions.

In one embodiment, the at least one first recessed portion includes at least one first recessed portion which has at least one second recessed portion inside the first recessed portion, and the plurality of minute recessed portions include a plurality of minute recessed portions provided inside the at least one second recessed portion.

A printing intaglio manufacturing method of an embodiment of the present invention is a method for manufacturing a printing intaglio, including the steps of: (a) providing a printing base which has a plurality of first recessed portions at its surface; (b) forming an aluminum film on the printing base; (c) after (b), anodizing a surface of the aluminum film, thereby forming a porous alumina layer which has a plurality of minute recessed portions; (d) after (c), bringing the porous alumina layer into contact with an etching solution, thereby enlarging the plurality of minute recessed portions of the porous alumina layer; and (e) removing part of the aluminum film formed outside the plurality of first recessed portions.

In one embodiment, the step (e) is performed after the steps (c) and (d).

In one embodiment, the step (a) includes the steps of (a1) providing a base, (a2) forming a first resist layer on the base, (a3) photolithographically patterning the first resist layer, and (a4) performing an etching treatment on the base using the patterned first resist layer as a mask, and by the etching treatment in the step (a4), the plurality of first recessed portions are formed at the surface of the printing base.

In one embodiment, the step (e) includes the step of (e1) removing the first resist layer patterned in the step (a3).

In one embodiment, in the step (a), at least one of the plurality of first recessed portions has at least one second recessed portion inside the first recessed portion, and the step (e) includes the step of (e2) removing part of the aluminum film formed in a region outside the at least one second recessed portion.

In one embodiment, the step (a) includes the steps of (a5) forming a second resist layer on the printing base, (a6) photolithographically patterning the second resist layer, and (a7) performing an etching treatment on the printing base using the patterned second resist layer as a mask, and by the etching treatment in the step (a7), the at least one second recessed portion is formed at the surface of the printing base.

In one embodiment, the step (e) includes the step of (e3) removing the second resist layer patterned in the step (a7).

In one embodiment, the step (a5) is performed after the step (a4) and includes the step of forming the second resist layer on the first resist layer.

A printed material production method of an embodiment of the present invention is a method for producing a printed material using the printing intaglio as set forth in any of the above paragraphs or a printing intaglio manufactured by the printing intaglio manufacturing method as set forth in any of the above paragraphs, the method including the steps of: providing the printing intaglio; providing a substrate; applying a printing ink which includes a photocurable resin between the printing intaglio and a surface of the substrate and irradiating the printing ink with light, thereby curing the printing ink; and separating the printing intaglio from a printing layer formed by the cured printing ink.

In one embodiment, the printing ink further includes a pigment whose average particle diameter is greater than a two-dimensional size of the plurality of minute recessed portions of the printing intaglio.

In one embodiment, the printing ink further includes a pigment whose average particle diameter is smaller than a two-dimensional size of the plurality of minute recessed portions of the printing intaglio. Preferably, the printing ink further includes a pigment whose average particle diameter is not more than ¼ of the two-dimensional size of the plurality of minute recessed portions of the printing intaglio.

In one embodiment, the printing ink includes a first ink and a second ink, the first ink including a pigment, the second ink including the photocurable resin but not including a pigment, and the first ink is applied between the substrate and the second ink.

A printed material of an embodiment of the present invention is a printed material including a substrate and a printing layer provided on the substrate, wherein the printing layer includes a plurality of island portions, at least one of the plurality of island portions has a plurality of minute raised portions at its surface, and when viewed in a direction normal to the printed material, a two-dimensional size of the plurality of minute raised portions is not less than 10 nm and less than 500 nm.

In one embodiment, the at least one island portion includes at least one island portion which has at least one raised portion on the island portion, and the plurality of minute raised portions include a plurality of minute raised portions provided at a surface of the at least one raised portion.

Advantageous Effects of Invention

According to an embodiment of the present invention, a printing intaglio which is capable of producing a printed material which is capable of deterring of counterfeiting and/or which can be easily authenticated while suppressing decrease of the production yield, a method for manufacturing such a printing intaglio, a method for producing a printed material using such a printing intaglio, and a printed material.

DESCRIPTION OF EMBODIMENTS

Figure 1:
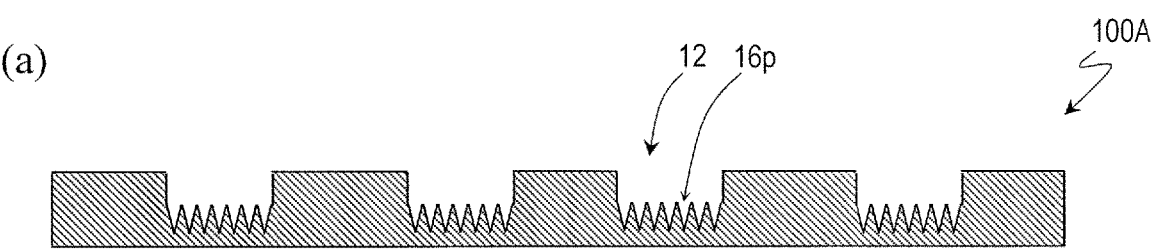
FIG. 1(a) is a schematic cross-sectional view of a printing intaglio 100A of Embodiment 1 of the present invention.
FIGS. 1(b) and 1(c) are schematic cross-sectional views for illustration of a method for producing a printed material using the printing intaglio 100A.
FIG. 1(d) is a schematic cross-sectional view of a printed material 50A produced using the printing intaglio 100A.
Figure 1:
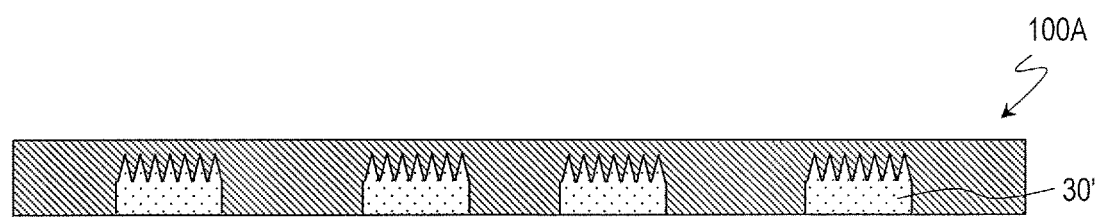
Figure 1:
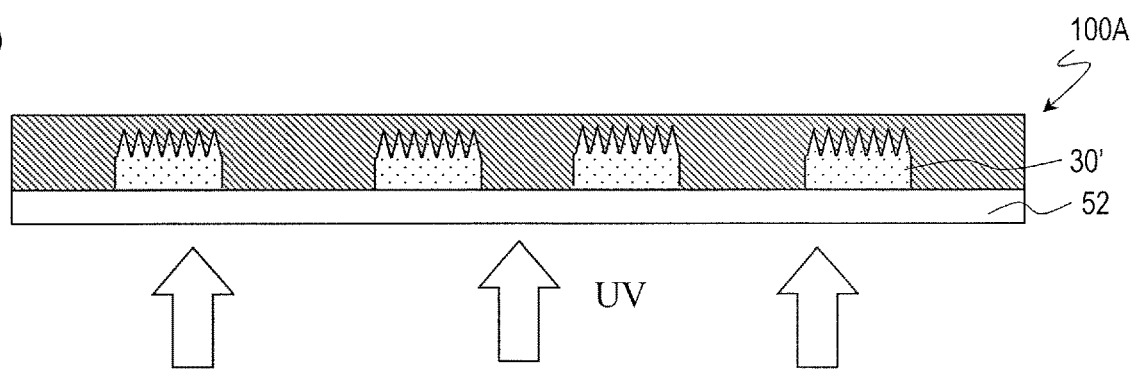
Figure 1:
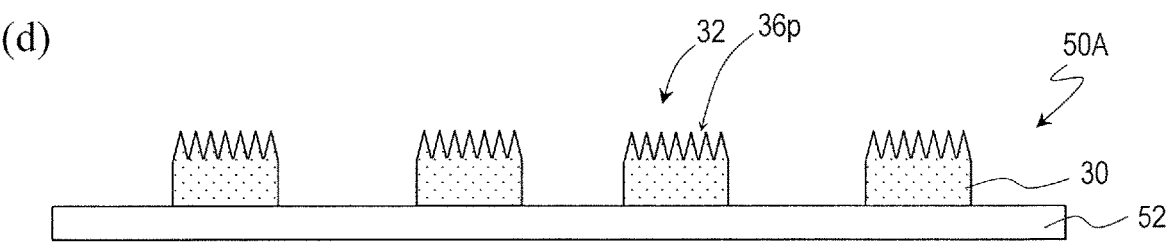

Hereinafter, a printing intaglio, a method for manufacturing a printing intaglio, a method for producing a printed material using a printing intaglio, an authenticatable printed material, and a method for authenticating a printed material, which are embodiments of the present invention, are described with reference to the drawings. The present invention is not limited to the embodiments illustrated below. In the drawings mentioned below, components which have substantially the same functions are designated with common reference numerals, and the descriptions thereof are sometimes omitted.

The present applicant has developed a method of producing an antireflection film (or antireflection surface) which has a moth-eye structure using an anodized porous alumina layer obtained by anodization of aluminum (Patent Documents 5 to 8). Utilizing an anodized porous aluminum film can facilitate the manufacture of a mold which is used for formation of a moth-eye structure over a surface (hereinafter, "moth-eye mold"). The structure of the surface of a moth-eye mold which is capable of forming a moth-eye structure is herein referred to as "inverted moth-eye structure". In particular, as described in Patent Documents 5 to 8, when the surface of the anodized aluminum film as formed is used as a mold without any modification, a large effect of reducing the manufacturing cost is achieved. The entire disclosures of Patent Documents 4 to 8 are incorporated by reference in this specification.

The present inventor applied the above-described technique and thereby developed a printing intaglio for use in intaglio printing.

Figure 2:
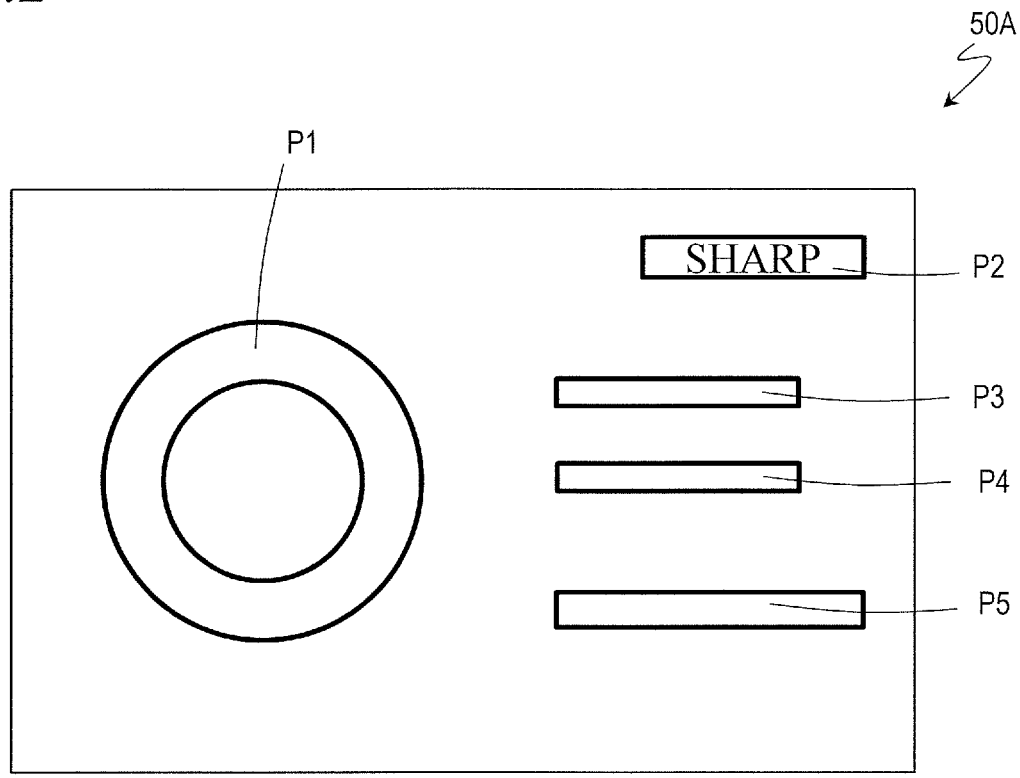
FIG. 2(a) is a schematic plan view of the printed material 50A viewed in the normal direction.
FIG. 2(b) is an enlarged view of one of the patterns included in a printed portion P2 of FIG. 2(a).
FIG. 2(c) is a schematic diagram enlargedly showing part of FIG. 2(b).
Figure 2:
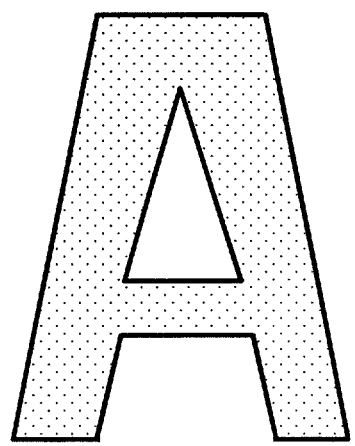
Figure 2:
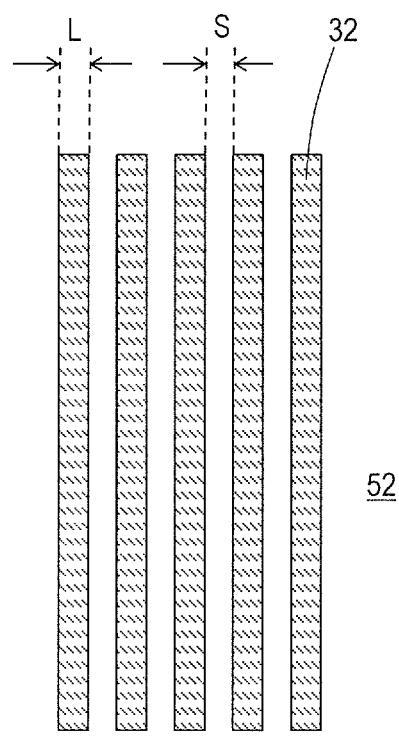

A printing intaglio 100A of Embodiment 1 of the present invention, a method for producing a printed material using the printing intaglio 100A, and the configuration of a printed material 50A produced using the printing intaglio 100A are described with reference to FIG. 1 and FIG. 2.

FIG. 1(a) is a schematic cross-sectional view of a printing intaglio 100A of Embodiment 1 of the present invention. FIGS. 1(b) and 1(c) are schematic cross-sectional views for illustration of a method for producing a printed material using the printing intaglio 100A. FIG. 1(d) is a schematic cross-sectional view of a printed material 50A produced using the printing intaglio 100A. FIG. 2(a) is a schematic plan view of the printed material 50A viewed in the normal direction. FIG. 2(b) is an enlarged view of one of the patterns included in a printed portion P2 of FIG. 2(a). FIG. 2(c) is a schematic diagram enlargedly showing part of FIG. 2(b).

The printing intaglio 100A is a printing intaglio for use in intaglio printing. As shown in FIG. 1(a), the printing intaglio 100A has a surface which has a plurality of first recessed portions 12 that form a pattern to be printed. That is, the plurality of first recessed portions 12 receive a printing ink and form a pattern to be printed on a substrate. When viewed in the direction normal to the surface of the printing intaglio 100A, the width of the plurality of first recessed portions 12 is, for example, 10 μm to 100 μm. At least one of the plurality of first recessed portions 12 has a plurality of minute recessed portions 16p inside the first recessed portion 12. For example, at least one of the plurality of first recessed portions 12 has a plurality of minute recessed portions 16p at the bottom surface of the first recessed portion 12. In an example shown in FIG. 1(a), every one of the plurality of first recessed portions 12 has a plurality of minute recessed portions 16p inside the first recessed portion 12. However, as a matter of course, only some of the plurality of first recessed portions 12 may have a plurality of minute recessed portions 16p inside the first recessed portions 12.

When viewed in the direction normal to the surface of the printing intaglio 100A, the two-dimensional size of the plurality of minute recessed portions 16p is not less than 10 nm and less than 500 nm. The plurality of minute recessed portions 16p typically form an inverted moth-eye structure. Herein, the "two-dimensional size" of a recessed portion refers to the diameter of a circle equivalent to the area of the recessed portion when viewed in the direction normal to the surface. For example, when a recessed portion has a conical shape, the two-dimensional size of the recessed portion is equivalent to the diameter of the base of the cone. The same applies to the "two-dimensional size" of a raised portion. When the minute recessed portions 16p are densely arranged so that there is no gap between adjoining minute recessed portions 16p (e.g., the bases of the cones partially overlap each other) as shown in FIG. 4(e), the average adjoining distance of two adjoining minute recessed portions 16p is generally equal to the two-dimensional size of the minute recessed portions 16p. A typical adjoining distance of the minute recessed portions 16p is more than 20 nm and not more than 1000 nm. A typical depth of the minute recessed portions 16p is not less than 50 nm and less than 500 nm. Details of the configuration of the printing intaglio 100A will be described later with reference to FIG. 3(e).

Next, a method for producing a printed material using the printing intaglio 100A is described with reference to FIGS. 1(b) and 1(c). First, the printing intaglio 100A and a substrate 52 are provided. The substrate 52 is, for example, a sheet of paper or a plastic film. As shown in FIG. 1(b), a printing ink 30' is applied into a plurality of first recessed portions 12 of the printing intaglio 100A. Then, as shown in FIG. 1(c), the printing ink 30' is irradiated with ultraviolet (UV) light while the printing intaglio 100A is pressed against the substrate 52, whereby the printing ink 30' is cured to form a printing layer 30 on the substrate 52. The printing ink 30' includes, for example, a UV-curable resin. Thereafter, the printing intaglio 100A is separated (dissociated) from the substrate 52, so that a printing layer 30 to which the surface structure of the printing intaglio 100A, i.e., the plurality of first recessed portions 12 and the plurality of minute recessed portions 16p, is transferred is formed on the surface of the substrate 52. In this way, the printed material 50A shown in FIG. 1(d) is produced.

Formation of the printing layer 30 by curing the printing ink 30' is not limited to curing by ultraviolet irradiation. The printing ink 30' may include a photocurable resin which can be cured by visible light or may include a thermosetting resin. The printing ink 30' may be cured using together light irradiation and heat treatment. The number of times of the light irradiation and/or heat treatment is not particularly limited. The light irradiation and/or heat treatment may be performed only once or may be performed a plurality of times. Typically, the printing ink 30' further includes a solvent. The printing ink 30' may be cured by performing the step of evaporating the solvent (e.g., heat treatment). Usually, the printing ink 30' further includes a pigment (coloring pigment) and/or dye (colorant). However, herein, the printing ink 30' may be a colorless ink which does not include a pigment and/or dye.

As shown in FIG. 1(d), the printed material 50A produced using the printing intaglio 100A includes the printing layer 30 that is formed of the printing ink on the substrate 52. The printing layer 30 includes a plurality of island portions 32. The plurality of island portions 32 constitute a pattern printed on the substrate 52. At least one of the plurality of island portions 32 has a plurality of minute raised portions 36p at its surface. When viewed in the direction normal to the printed material 50A, the two-dimensional size of the plurality of minute raised portions 36p is not less than 10 nm and less than 500 nm. The plurality of minute raised portions 36p typically constitute a moth-eye structure.

The island portions 32 and the minute raised portions 36p of the printing layer 30 are formed corresponding to the first recessed portions 12 and the minute recessed portions 16p, respectively, at the surface of the printing intaglio 100A. That is, the island portions 32 and the minute raised portions 36p of the printing layer 30 are formed by raised portions which are inverse of the first recessed portions 12 and the minute recessed portions 16p, respectively, at the surface of the printing intaglio 100A.

The pattern printed on (transferred to) the surface of the printed material 50A, i.e., the plurality of island portions 32 of the printing layer 30, is a mirror reflection of the pattern formed by the plurality of first recessed portions 12 at the surface of the printing intaglio 100A.

FIG. 2(a) shows a schematic example of the printed material 50A. For example, the printed material 50A has a plurality of printed portions P1 to P5. Each of the printed portions P1 to P5 can include a plurality of patterns. The patterns are, for example, figures, pictures, designs, lines, shapes, characters, symbols, etc. For example, the printed portion P2 shown in FIG. 2(a) includes five patterns, herein five alphabetical characters, "S", "H", "A", "R" and "P". Of these characters, alphabetical character "A" is shown in FIG. 2(b). In each of the printed portions, at least some of the plurality of patterns formed on the surface of the printed material may overlap each other. In some cases, at least some of the plurality of printed portions formed on the surface of the printed material overlap each other. The printing intaglio 100A corresponds to, for example, any one or some of the plurality of printed portions formed on the printed material 50A. The printing intaglio 100A may correspond to at least one pattern. For example, a plurality of types of printing intaglios 100A are used for production of a single printed material 50A. Each printed portion may be formed using a combination of a plurality of types of printing intaglios 100A. As a matter of course, the printing intaglio 100A may correspond to all of the printed portions formed on the printed material 50A.

FIG. 2(c) is a schematic diagram enlargedly showing part of alphabetical character "A" shown in FIG. 2(b). Each of the patterns includes, for example, a plurality of island portions 32 as shown in FIG. 2(c). The plurality of island portions 32 are arranged with equal intervals. The width of each of the plurality of island portions 32, L, is for example 10 μm to 100 μm. The width of the gap between two adjoining island portions 32, S, is for example 10 μm to 100 μm.

Since the printed material 50A has the plurality of minute raised portions 36p at the surfaces of the island portions 32 of the printing layer 30, the printed material can be authenticated based on the presence/absence of the plurality of minute raised portions 36p. As a result, counterfeiting of the printed material 50A can be deterred. For example, if the printed material 50A is copied on a copier, the physical structure of the plurality of minute raised portions 36p and its optical characteristics cannot be reproduced.

The optical characteristics of the plurality of minute raised portions 36p are now described. The two-dimensional size of raised portions of an uneven pattern which performs an antireflection function is not less than 10 nm and less than 500 nm. Therefore, in some of the island portions 32 of the printing layer 30 which have a plurality of minute raised portions 36p at the surfaces, the plurality of minute raised portions 36p at the surfaces perform an antireflection function. That is, on some of the island portions 32 of the printing layer 30 which have a plurality of minute raised portions 36p at the surfaces, the surface reflection is smaller than on the other island portions 32 which do not have the plurality of minute raised portions 36p at the surfaces.

For example, the reflectance of an antireflection film having a moth-eye structure at its surface and the reflectance of a resin film having no uneven structure at its surface were compared. The reflectance of the antireflection film was 0.02%, while the reflectance of the resin film having no uneven structure at its surface was 4.2%. The antireflection film and the resin film were each produced by curing a UV-curable resin over a TAC film. In measuring the reflectance, the films were adhered to a black acrylic plate using an adhesive sheet. The reflectance was measured using Spectrophotometer V-700 manufactured by JASCO Corporation. The measured surface reflectance was the specular reflectance with incident angle of 5 degrees.

The same applies to the printing layer formed on the printed material, i.e., the reflectance varies depending on the presence/absence of the minute raised portions 36p at the surface. This can be utilized for authentication of the printed material.

The printed material 50A can be authenticated by, for example, measuring the reflectance of island portions 32 included in an area of 1 mm (1000 μm) in radius in a pattern formed of a printing ink including carbon black at a predetermined position on the printed material 50A and determining whether or not the measured reflectance is not more than 1.0%. In measuring the reflectance, for example, a handheld spectrophotometer (e.g., CM-2600d manufactured by KONICA MINOLTA HOLDINGS, INC.) is used.

The method for authenticating a printed material is not limited to the above-described example. The reflectance can vary depending on the measurement method, the substrate, the printing ink, etc. The value at which the presence/absence of the minute raised portions 36p at the surface can be determined can be suitably adjusted and set.

The printed material 50A can also be authenticated by the difference in contact angle at the surface of the printing layer 30. The printing layer 30 has minute raised portions 36p at its surface and accordingly can have a different contact angle (static contact angle) of water and/or oil with respect to the printing layer 30. For example, when the printing layer 30 has minute raised portions 36p at its surface, the printing layer 30 accordingly has a large contact angle of water with respect to the surface. The printed material 50A may be authenticated by, for example, dropping water or oil (hexadecane) using a dropper on a pattern formed at a predetermined position on the printed material 50A and visually checking the wettability of the water or oil. Alternatively, the printed material 50A can also be authenticated by, for example, measuring the contact angle of the surface of island portions 32 included in an area of 1 mm (1000 μm) in radius in a pattern formed at a predetermined position on the printed material 50A and determining whether or not the measured contact angle is not less than 100°. In measuring the contact angle, for example, a portable contact angle meter (e.g., PCA-1 manufactured by Kyowa Interface Science Co., Ltd.) is used.

The method for authenticating a printed material is not limited to the above-described examples. The value at which the presence/absence of the minute raised portions 36p at the surface can be determined can be suitably adjusted and set. The specific value of the contact angle can vary depending on the substrate, the printing ink, etc. The contact angle can vary by, for example, not less than 40° depending on the presence/absence of the minute raised portions 36p at the surface, and therefore, the presence/absence of the minute raised portions 36p at the surface can be determined.

When the printing layer 30 includes an island portion 32 which has a plurality of minute raised portions 36p at its surface and an island portion 32 which does not have a plurality of minute raised portions 36p at its surface, these island portions 32 have different reflectances and/or different contact angles at the surfaces. A printed material which includes such a printing layer 30 can be more easily authenticated because the presence/absence of the minute raised portions 36p can be easily distinguished.

Since at least one of the plurality of first recessed portions 12 of the printing intaglio 100A has a plurality of minute recessed portions 16p inside the first recessed portion 12, the printing layer 30 and the plurality of minute raised portions 36p can be formed in the same step. Further, misalignment between the island portions 32 and the plurality of minute raised portions 36p would not occur. The printing intaglio 100A is capable of producing a printed material which can be easily authenticated and which is capable of deterring counterfeiting while suppressing decrease of the production yield.

Figure 9:
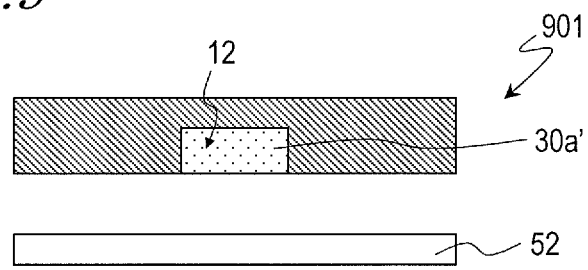
FIGS. 9(a) to 9(e) are schematic cross-sectional views for illustration of a printing intaglio of a reference example and a printed material production method of a reference example.
Figure 9:
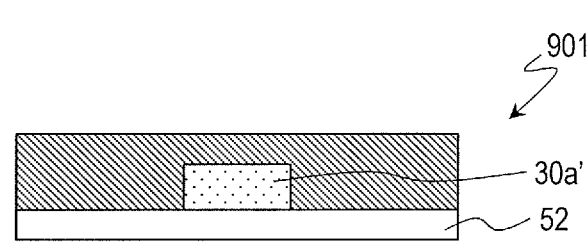
Figure 9:
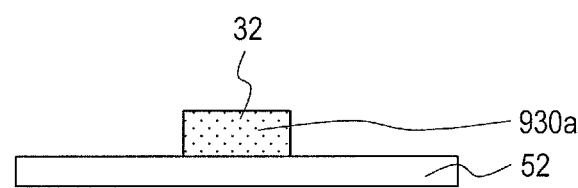
Figure 9:
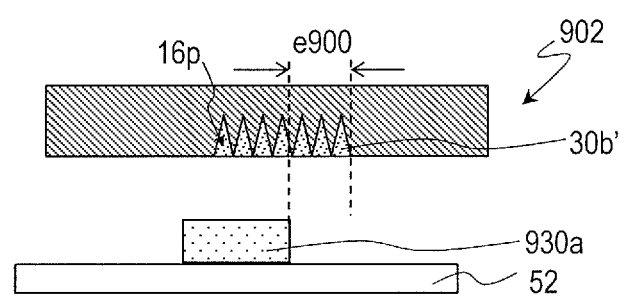
Figure 9:
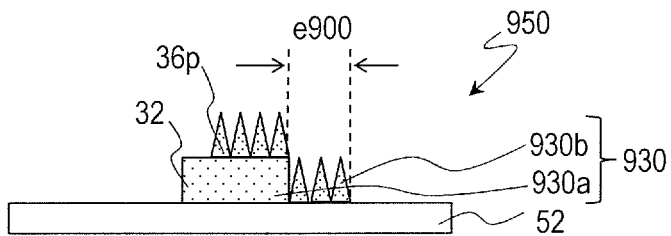

A printing intaglio of a reference example and a printed material production method of a reference example are described with reference to FIG. 9. FIGS. 9(a) to 9(e) are schematic cross-sectional views for illustration of the printing intaglio of the reference example and the printed material production method of the reference example.

In the printed material production method of the reference example, two types of printing intaglios 901 and 902 are used. The printing intaglio 901 of the reference example has a surface which has a plurality of first recessed portions 12 that form a pattern to be printed. The printing intaglio 902 of the reference example has a surface which has a plurality of minute recessed portions 16p. When viewed in the direction normal to the surface of the printing intaglio 902 of the reference example, the two-dimensional size of the plurality of minute recessed portions 16p is not less than 10 nm and less than 500 nm.

First, a printing intaglio 901 of the reference example and a substrate 52 are provided. As shown in FIG. 9(a), a printing ink 30a' is applied into a plurality of first recessed portions 12 of the printing intaglio 901 of the reference example. Then, the printing intaglio 901 of the reference example is pressed against the substrate 52 as shown in FIG. 9(b), whereby a printing layer 930a is formed on the substrate 52 as shown in FIG. 9(c). The printing layer 930a includes a plurality of island portions 32 which constitute a pattern to be printed. The printing layer 930a on the substrate 52 can be formed by a known printing method.

Thereafter, as shown in FIG. 9(d), a UV-curable resin 30b' is applied into the plurality of minute recessed portions 16p of the printing intaglio 902 of the reference example. Thereafter, the UV-curable resin 30b' is irradiated with ultraviolet light while the printing intaglio 902 of the reference example is pressed against the substrate 52, whereby the UV-curable resin 30b' is cured to form a printing layer 930b on the substrate 52. Thereafter, the printing intaglio 902 of the reference example is separated (dissociated) from the substrate 52, so that the printing layer 930b is formed on the surface of the substrate 52. Through the above-described process, a printed material 950 of the reference example shown in FIG. 9(e) is produced.

The printing layer 930 of the printed material 950 of the reference example includes the printing layers 930a and 930b. The printing layer 930 of the printed material 950 of the reference example includes a plurality of island portions 32, and furthermore, the surfaces of the plurality of island portions 32 have a plurality of minute raised portions 36p.

These aspects are common to the printed material 950 of the reference example and the printed material 50 of the embodiment of the present invention. However, as previously described, in the printed material production method of the reference example, two types of printing intaglios 901 and 902 are used, and therefore, the number of steps is greater than that of the embodiment of the present invention. As previously described with reference to FIG. 9(d), after the plurality of island portions 32 are formed on the substrate 52, the plurality of minute raised portions 36p are formed on the plurality of island portions 32. Therefore, there is a probability that misalignment e900 between the island portion 32 and the plurality of minute raised portions 36p (i.e., misalignment between the printing layer 930a and the printing layer 930b) will occur. For example, as shown in FIG. 9(e), minute raised portions 36p can be formed beyond a region which is on the island portions 32. If the misalignment e900 is large so that the printing layer 930b is not formed on the printing layer 930a, it will be difficult to authenticate the printed material. If the printing layer 930b is formed on the printing layer 930a but the area of the printing layer 930b formed on the printing layer 930a is small due to the misalignment e900, there is a probability that it will be difficult to authenticate the printed material. Thus, there is a probability that the printed material 950 of the reference example will not sufficiently achieve the effect of easy authentication, and as a result, there is a probability that the effect of deterring counterfeiting will not be sufficiently achieved.

Thus, the printed material 950 of the reference example can have a problem that the production yield decreases (problem 1) and a problem that the effect of deterring counterfeiting and/or the effect of easy authentication cannot be sufficiently achieved (problem 2). On the other hand, according to a printing intaglio and a printed material production method with the use of the printing intaglio which are embodiments of the present invention, problem 1 and problem 2 can be solved as described above.

Figure 3:
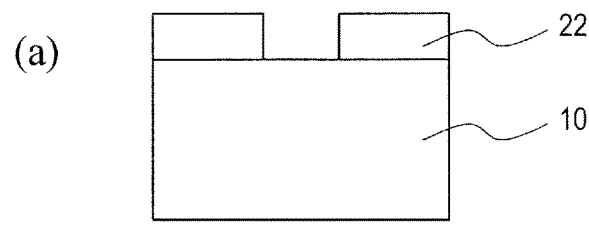
FIGS. 3(a) to 3(e) are schematic cross-sectional views for illustration of a method for manufacturing the printing intaglio 100A.
Figure 3:
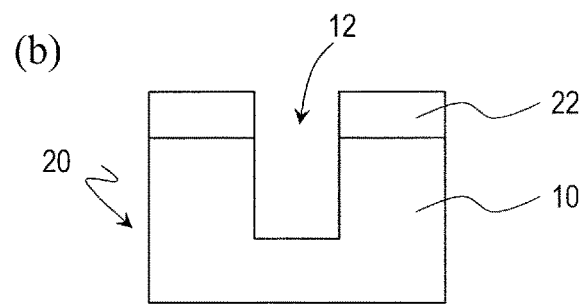
Figure 3:
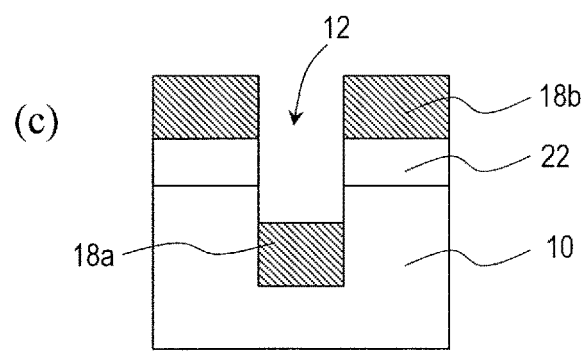
Figure 3:
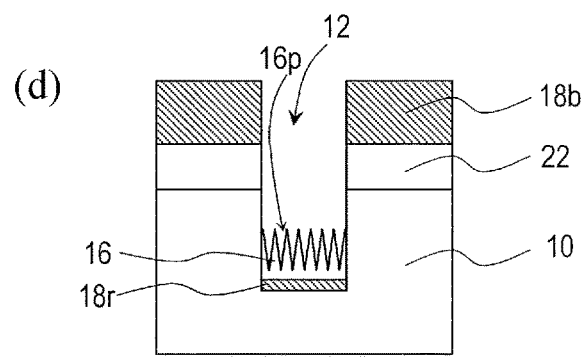
Figure 3:
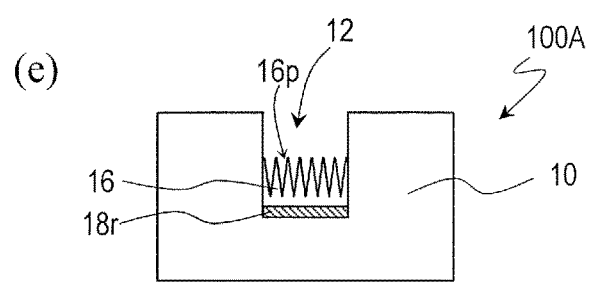
Figure 4:
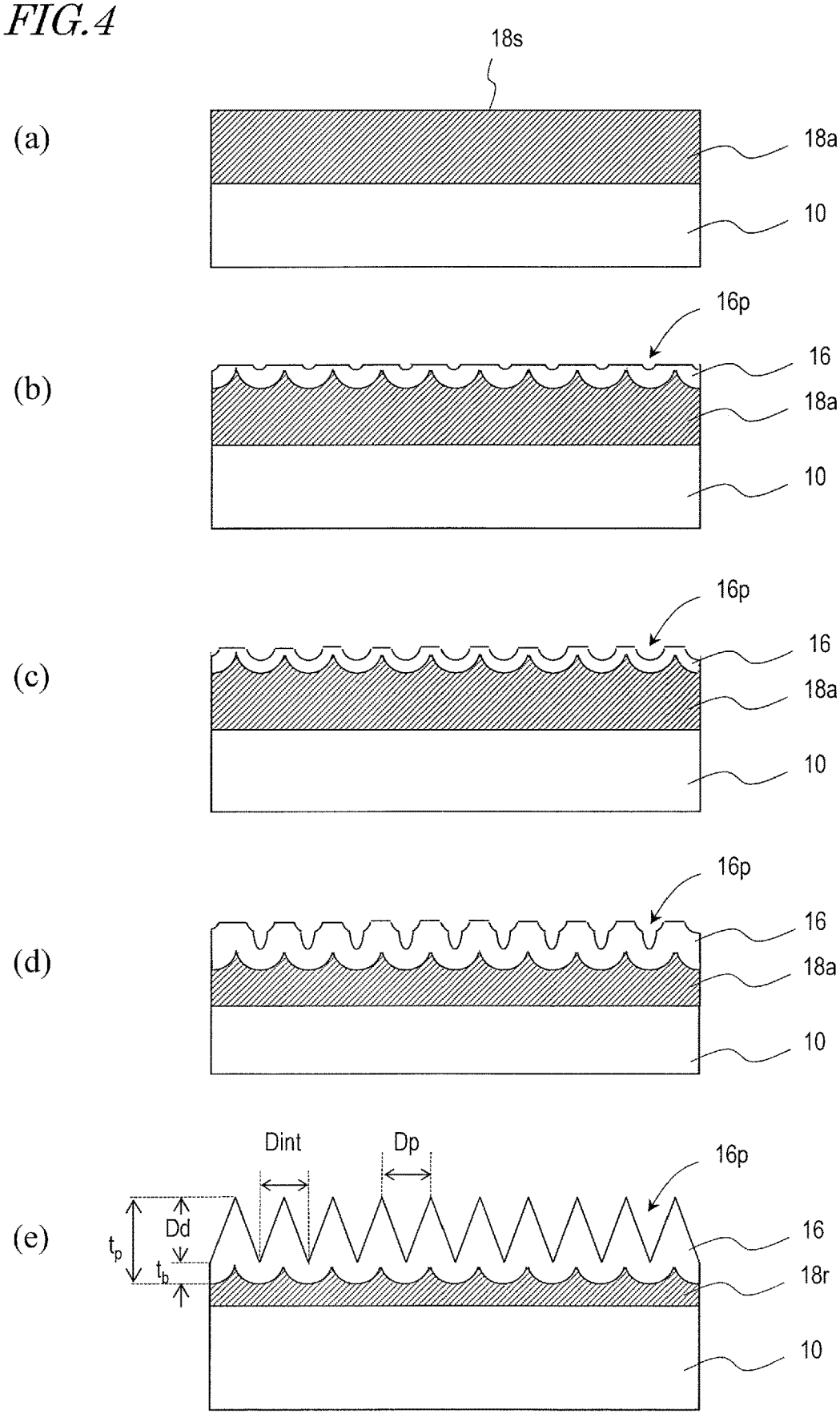
FIGS. 4(a) to 4(e) are schematic cross-sectional views for illustration of a method for manufacturing the printing intaglio 100A. These cross-sectional views schematically and enlargedly show an inner part of a plurality of first recessed portions 12 of the printing intaglio 100A.

A method for manufacturing the printing intaglio 100A is described with reference to FIG. 3 and FIG. 4. FIGS. 3(a) to 3(e) and FIGS. 4(a) to 4(e) are schematic cross-sectional views for illustration of the method for manufacturing the printing intaglio 100A. FIGS. 4(a) to 4(e) are cross-sectional views schematically and enlargedly showing an inner part of a plurality of first recessed portions 12 of the printing intaglio 100A, and are schematic cross-sectional views for illustrating the step of anodizing an aluminum film 18 formed in the first recessed portions 12 and the step of etching a porous alumina layer 16.

First, a base 10 is provided as shown in FIG. 3(a). The base 10 is typically a metal base. For example, the base 10 is a copper base.

A resist film is formed on the base 10 (e.g., over the entire surface of the base 10). The resist film is photolithographically patterned such that a first resist layer 22 is obtained. As shown in FIG. 3(b), an etching treatment is performed on the base 10 using the patterned first resist layer 22 as an etching mask. By this etching treatment, a plurality of first recessed portions 12 are formed at the surface of the base 10. The plurality of first recessed portions 12 form a pattern which is reverse of a pattern to be printed on a substrate. By forming the plurality of first recessed portions 12 on the surface of the base 10, a printing base 20 is obtained.

When necessary, a degreasing step and a water washing step are performed before the resist film is formed on the base 10. When necessary, water washing is preferably performed between the steps performed with different solutions.

Then, an inorganic material layer (not shown) is formed on the surface of the base 10. Thereafter, as shown in FIG. 3(c) and FIG. 4(a), an aluminum film 18 is formed on the inorganic material layer. FIG. 4(a) corresponds to FIG. 3(c) and enlargedly shows an inner part of a first recessed portion 12. Part of the aluminum film 18 which is formed inside the first recessed portion 12 is referred to as "aluminum film 18a". Part of the aluminum film 18 which is formed outside the first recessed portion 12 is referred to as "aluminum film 18b".

The inorganic material layer is formed, for example, over the entire surface of the base 10. The inorganic material layer is formed, for example, inside the first recessed portions 12 and on the patterned first resist layer 22. The material of the inorganic material layer can be, for example, tantalum oxide ($Ta_2O_5$) or silicon dioxide ($SiO_2$). The inorganic material layer can be formed by, for example, sputtering. When a tantalum oxide layer is used as the inorganic material layer, the thickness of the tantalum oxide layer is, for example, 200 nm.

The inorganic material layer can prevent the base 10 and the aluminum film 18 from being in direct contact with each other. If the base 10 and the aluminum film 18 are in direct contact with each other, a local cell will be formed between the base 10 and the aluminum film 18 in an etching solution in the etching step of the process of forming a porous alumina layer 16 which will be described later, and as a result, nonuniform corrosion, such as pitting corrosion or crevice corrosion, can occur. When the inorganic material layer is formed, occurrence of the above-described nonuniform corrosion can be suppressed. Preferably, the inorganic material layer is formed not only on the bottom surface of the first recessed portions 12 but also on the lateral surface of the first recessed portions 12. When the inorganic material layer is formed by, for example, sputtering, the inorganic material layer can be formed not only on the bottom surface of the first recessed portions 12 but also on the lateral surface of the first recessed portions 12. From the viewpoint of increasing the thickness of the inorganic material layer formed on the lateral surface of the first recessed portions 12, it is preferred that the first recessed portions 12 have a tapered shape. When a printed material is produced using the printing intaglio 100A in which the inorganic material layer is formed on the lateral surface of the first recessed portions 12, the width of the printing layer formed by the first recessed portions 12 decreases by the thickness of the inorganic material layer formed on the lateral surface of the first recessed portions 12. Therefore, the width of the first recessed portions 12 is preferably set to a value obtained by adding the thickness of the inorganic material layer formed on the lateral surface of the first recessed portions 12 to a desired width of the printing layer.

The thickness of the inorganic material layer is preferably not less than 100 nm and less than 500 nm. If the thickness of the inorganic material layer is not less than 500 nm, insulation is likely to occur between the base 10 and the aluminum film 18 due to the surface condition of the base 10. To realize anodization of the aluminum film 18 by supplying an electric current from the base 10 side to the aluminum film 18, the electric current needs to flow between the base 10 and the aluminum film 18. If the thickness of the inorganic material layer is less than 100 nm, there is a probability that a defect (typically, a void; i.e., a gap between crystal grains) occurs in the aluminum film 18.

To form a thick inorganic material layer, it is in general necessary to increase the film formation duration. When the film formation duration is increased, the surface temperature of the base 10 unnecessarily increases, and as a result, there is a probability that the film quality of the aluminum film 18 will deteriorate and a defect (typically, a void) will occur. When the thickness of the inorganic material layer is less than 500 nm, occurrence of such a problem can be suppressed.

The aluminum film 18 is, for example, a film which is made of aluminum whose purity is not less than 99.99 mass % (hereinafter, also referred to as "high-purity aluminum film") as disclosed in Patent Document 7. The aluminum film is formed by, for example, vacuum evaporation or sputtering. The thickness of the aluminum film 18 is preferably in the range of not less than about 500 nm and not more than about 1500 nm. For example, the thickness of the aluminum film 18 is about 1 µm.

The aluminum film 18 may be an aluminum alloy film disclosed in Patent Document 8 instead of the high-purity aluminum film. The aluminum alloy film disclosed in Patent Document 8 includes aluminum, a metal element other than aluminum, and nitrogen. In this specification, the "aluminum film" includes not only the high-purity aluminum film but also the aluminum alloy film disclosed in Patent Document 8.

Using the above-described aluminum alloy film enables to obtain a specular surface whose reflectance is not less than 80%. The average grain diameter of crystal grains that form the aluminum alloy film when viewed in the direction normal to the aluminum alloy film is, for example, not more than 100 nm, and that the maximum surface roughness Rmax of the aluminum alloy film is not more than 60 nm. The content of nitrogen in the aluminum alloy film is, for example, not less than 0.5 mass % and not more than 5.7 mass %.

It is preferred that the absolute value of the difference between the standard electrode potential of the metal element other than aluminum which is included in the aluminum alloy film and the standard electrode potential of aluminum is not more than 0.64 V, and that the content of the metal element in the aluminum alloy film is not less than 1.0 mass % and not more than 1.9 massa. The metal element is, for example, Ti or Nd. The metal element is not limited to these examples but may be such a different metal element that the absolute value of the difference between the standard electrode potential of the metal element and the standard electrode potential of aluminum is not more than 0.64 V (for example, Mn, Mg, Zr, V, and Pb). Further, the metal element may be Mo, Nb, or Hf. The aluminum alloy film may include two or more of these metal elements. The aluminum alloy film is formed by, for example, a DC magnetron sputtering method. The thickness of the aluminum alloy film is also preferably in the range of not less than about 500 nm and not more than about 1500 nm. For example, the thickness of the aluminum alloy film is about 1 µm.

Then, a surface 18s of the aluminum film 18a is anodized to form a porous alumina layer 16 which has a plurality of minute recessed portions (micropores) 16p as shown in FIG. 4(b). The porous alumina layer 16 includes a porous layer which has the minute recessed portions 16p and a barrier layer (the base of the minute recessed portions 16p). As known in the art, the interval between adjacent minute recessed portions 16p (the distance between the centers) is approximately twice the thickness of the barrier layer and is approximately proportional to the voltage that is applied during the anodization. This relationship also applies to the final porous alumina layer 16 shown in FIG. 4(e).

The porous alumina layer 16 is formed by, for example, anodizing the surface 18s in an acidic electrolytic solution. The electrolytic solution used in the step of forming the porous alumina layer 16 is, for example, an aqueous solution which contains an acid selected from the group consisting of oxalic acid, tartaric acid, phosphoric acid, sulfuric acid, chromic acid, citric acid, and malic acid. For example, the surface 18s of the aluminum film 18a is anodized with an applied voltage of 80 V for 55 seconds using an oxalic acid aqueous solution (concentration: 0.3 mass %, solution temperature: 10° C.), whereby the porous alumina layer 16 is formed.

Then, the porous alumina layer 16 is brought into contact with an alumina etchant such that a predetermined amount is etched away, whereby the opening of the minute recessed portions 16p is enlarged as shown in FIG. 4(c). By modifying the type and concentration of the etching solution and the etching duration, the etching amount (i.e., the size and depth of the minute recessed portions 16p) can be controlled. The etching solution used may be, for example, an aqueous solution of 10 mass % phosphoric acid, organic acid such as formic acid, acetic acid or citric acid, or sulfuric acid, or a chromic/phosphoric acid solution. For example, the etching is performed for 20 minutes using a phosphoric acid aqueous solution (10 mass %, 30° C.)

Then, the aluminum film 18a is again partially anodized such that the minute recessed portions 16p are grown in the depth direction and the thickness of the porous alumina layer 16 is increased as shown in FIG. 4(d). Here, the growth of the minute recessed portions 16p starts at the bottoms of the previously-formed minute recessed portions 16p, and accordingly, the lateral surfaces of the minute recessed portions 16p have stepped shapes.

Thereafter, when necessary, the porous alumina layer 16 may be brought into contact with an alumina etchant to be further etched such that the pore diameter of the minute recessed portions 16p is further increased. The etching solution used in this step may preferably be the above-described etching solution. Practically, the same etching bath may be used.

In this way, by alternately repeating the anodization step and the etching step as described above through multiple cycles (e.g., 5 cycles: including 5 anodization cycles and 4 etching cycles), the porous alumina layer 16 which has the inverted moth-eye structure is obtained as shown in FIG. 4(e) and FIG. 3(d). Since the process is ended with the anodization step, the minute recessed portions 16p have pointed bottom portion. That is, a finally-obtained printing intaglio 100A shown in FIG. 3(e) is capable of forming minute raised portions with pointed tip ends.

The porous alumina layer 16 (thickness: tp) shown in FIG. 4(e) includes a porous layer (whose thickness is equivalent to the depth Dd of the minute recessed portions 16p) and a barrier layer (thickness: tb). Since the porous alumina layer 16 has a structure obtained by inverting the moth-eye structure of the printing layer 30 of the printed material 50A, corresponding parameters which define the dimensions may sometimes be designated by the same symbols.

The minute recessed portions 16p of the porous alumina layer 16 may have, for example, a conical shape and may have a stepped lateral surface. It is preferred that the two-dimensional size of the minute recessed portions 16p (the diameter of a circle equivalent to the area of the minute recessed portions 16p when viewed in a direction normal to the surface), Dp, is more than 20 nm and less than 500 nm, and the depth of the minute recessed portions 16p, Dd, is not less than 50 nm and less than 1000 nm (1 µm). It is also preferred that the bottom portion of the minute recessed portions 16p is acute (with the deepest part of the bottom portion being pointed). When the minute recessed portions 16p are in a densely packed arrangement, assuming that the shape of the minute recessed portions 16p when viewed in a direction normal to the porous alumina layer 16 is a circle, adjacent circles overlap each other, and a saddle portion is formed between adjacent ones of the minute recessed portions 16p. Note that, when the generally-conical minute recessed portions 16p adjoin one another so as to form saddle portions, the two-dimensional size of the minute recessed portions 16p, Dp, is equal to the adjoining distance Dint. The thickness of the porous alumina layer 16, tp, is not more than about 1 µm. The porous alumina layer 16 formed under the conditions illustrated herein has such a configuration that the minute recessed portions 16p are in an irregular densely-packed arrangement.

Under the porous alumina layer 16 shown in FIG. 4(e) and FIG. 3(d), there is an aluminum remnant layer 18r. The aluminum remnant layer 18r is part of the aluminum film 18a which has not been anodized. When necessary, the aluminum film 18a may be substantially thoroughly anodized such that the aluminum remnant layer 18r is not present. For example, when the inorganic material layer has a small thickness, it is possible to readily supply an electric current from the base 10 side.

Thereafter, as shown in FIG. 3(e), the patterned first resist layer 22 is removed. In this step, the aluminum film 18b formed on the patterned first resist layer 22, i.e., part 18b of the aluminum film 18 which is formed outside the first recessed portions 12, is removed. The etchant used for removal of the patterned first resist layer 22 is preferably selected from etchants which cause less damage to the porous alumina layer 16.

Through the above-described process, the printing intaglio 100A shown in FIG. 3(e) is obtained. The printing intaglio 100A includes a base 10 and a plurality of first recessed portions 12 provided at the surface of the base 10. At least one of the plurality of first recessed portions 12 includes a porous alumina layer 16. The porous alumina layer 16 includes a plurality of minute recessed portions 16p. At least one of the plurality of first recessed portions 12 may include an inorganic material layer (not shown) interposed between the porous alumina layer 16 and the base 10.

It is expected that part 18b of the aluminum film 18 which is formed outside the first recessed portions 12 and the base 10 are insulated from each other by the patterned first resist layer 22. Therefore, in the step of anodizing part 18a of the aluminum film 18 which is formed inside the first recessed portions 12, the aluminum film 18b would not be anodized when an electric current is supplied to the base 10. In the step of etching the porous alumina layer 16, the aluminum film 18b can be oxidized. However, it is estimated that whether or not the aluminum film 18b is anodized would not affect the properties of the printing intaglio 100A because part 18b of the aluminum film 18 which is formed outside the first recessed portions 12 is removed (lift off) together with the patterned first resist layer 22.

The step of removing the patterned first resist layer 22 is preferably performed after the step of anodizing the aluminum film 18a and the step of etching the porous alumina layer 16. This is because the patterned first resist layer 22 can protect the surface of the base 10 except for the plurality of first recessed portions 12, in the steps of anodizing the aluminum film 18a and etching the porous alumina layer 16.

Some of the plurality of first recessed portions 12 do not need to have a plurality of minute recessed portions 16p inside the first recessed portions 12. The first recessed portions 12 which do not have a plurality of minute recessed portions 16p inside can be formed, for example, as follows. After the step of forming the plurality of first recessed portions 12 at the surface of the base 10, but before the step of forming the inorganic material layer and the aluminum film 18, a resist film is formed on the base 10 (e.g., over the entire surface of the base 10) and photolithographically patterned, whereby a resist layer is obtained. Here, the resist layer is patterned so as to be formed inside first recessed portions 12 in which a plurality of minute recessed portions 16p are not to be formed. Thereafter, the printing intaglio 100A is manufactured through the above-described process. The resist layer formed inside the first recessed portions 12 is removed in the step of removing the first resist layer.

In the method for manufacturing the printing intaglio 100A which has previously been described with reference to FIG. 3 and FIG. 4, a porous alumina layer 16 which has a plurality of minute recessed portions 16p is formed by alternately repeating the anodization step and the etching step through multiple cycles, although the printing intaglio manufacturing method of the embodiment of the present invention is not limited to this example. For example, a plurality of minute recessed portions 16p may be formed at a surface of a printing base 20 which has a plurality of first recessed portions 12 by a two-beam interference method or an electron beam direct write method. The plurality of minute recessed portions 16p do not need to be absolutely at random. So long as the plurality of minute recessed portions 16p are irregular to such an extent that interference and diffraction of light do not substantially occur, the difference in surface reflectance between a region which includes the plurality of minute recessed portions 16p and a region which does not include the plurality of minute recessed portions 16p can be considerable.

One of the advantages of the printing intaglio 100A of the embodiment of the present invention is that the porous alumina layer 16 can be formed relatively inexpensively. Note that, however, the frequency that another porous alumina layer 16 is required is high because the life of the porous alumina layer 16 is relatively short in some cases. The printing intaglio 100A can be recycled by removing the porous alumina layer 16 by, for example, etching with a phosphoric acid and forming an aluminum film in the first recessed portions 12 of the printing base 20. The etchant used for removal of the porous alumina layer 16 preferably has a low etching rate for the printing base 20. The type and concentration of the etching solution and the etching duration may be appropriately adjusted.

Figure 5:
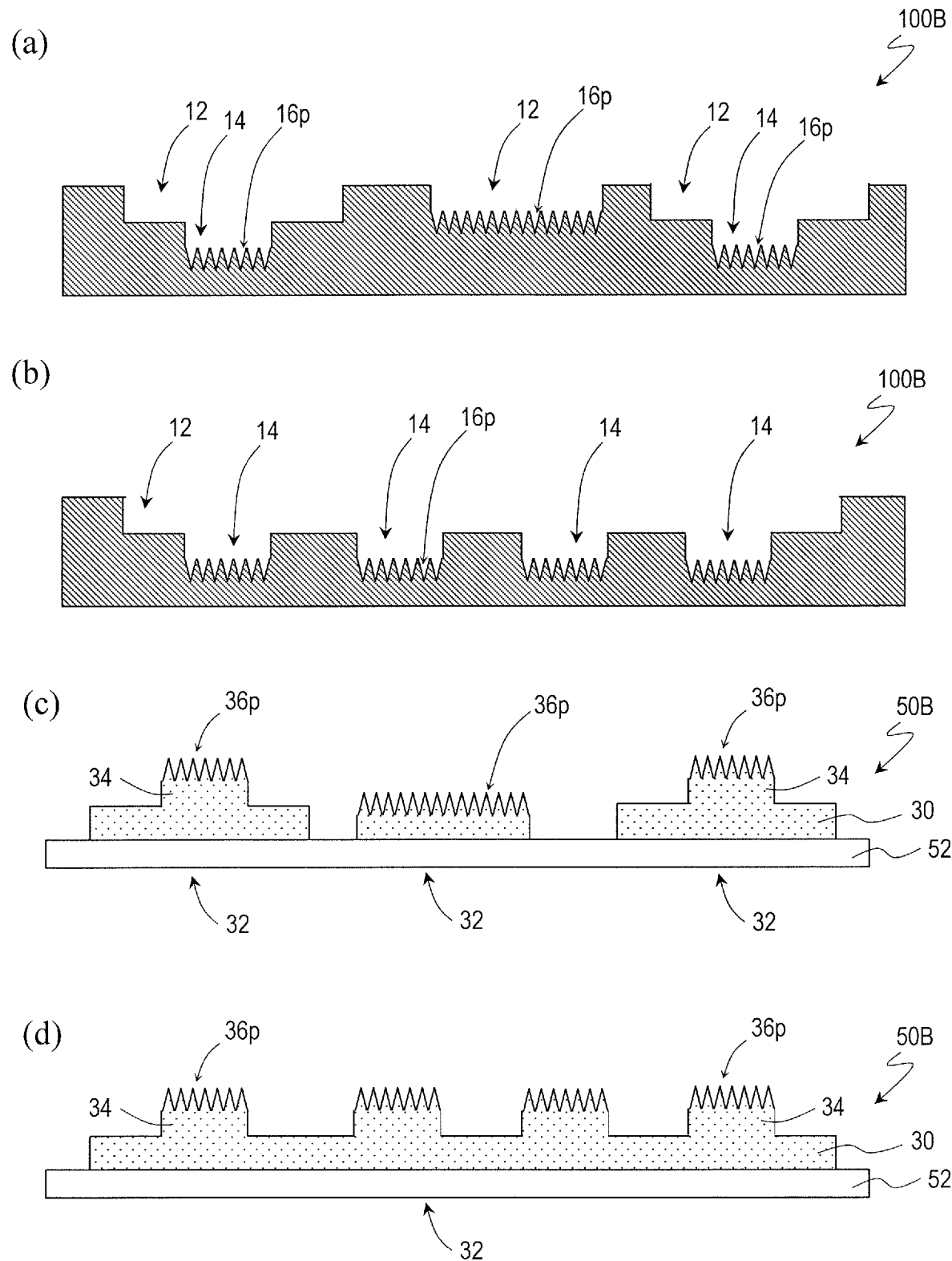
FIGS. 5(a) and 5(b) are each an example of a schematic cross-sectional view of a printing intaglio 100B of Embodiment 2 of the present invention.
FIGS. 5(c) and 5(d) are schematic cross-sectional views of printed materials 50B produced using the printing intaglios 100B shown in FIGS. 5(a) and 5(b), respectively.
Figure 6:
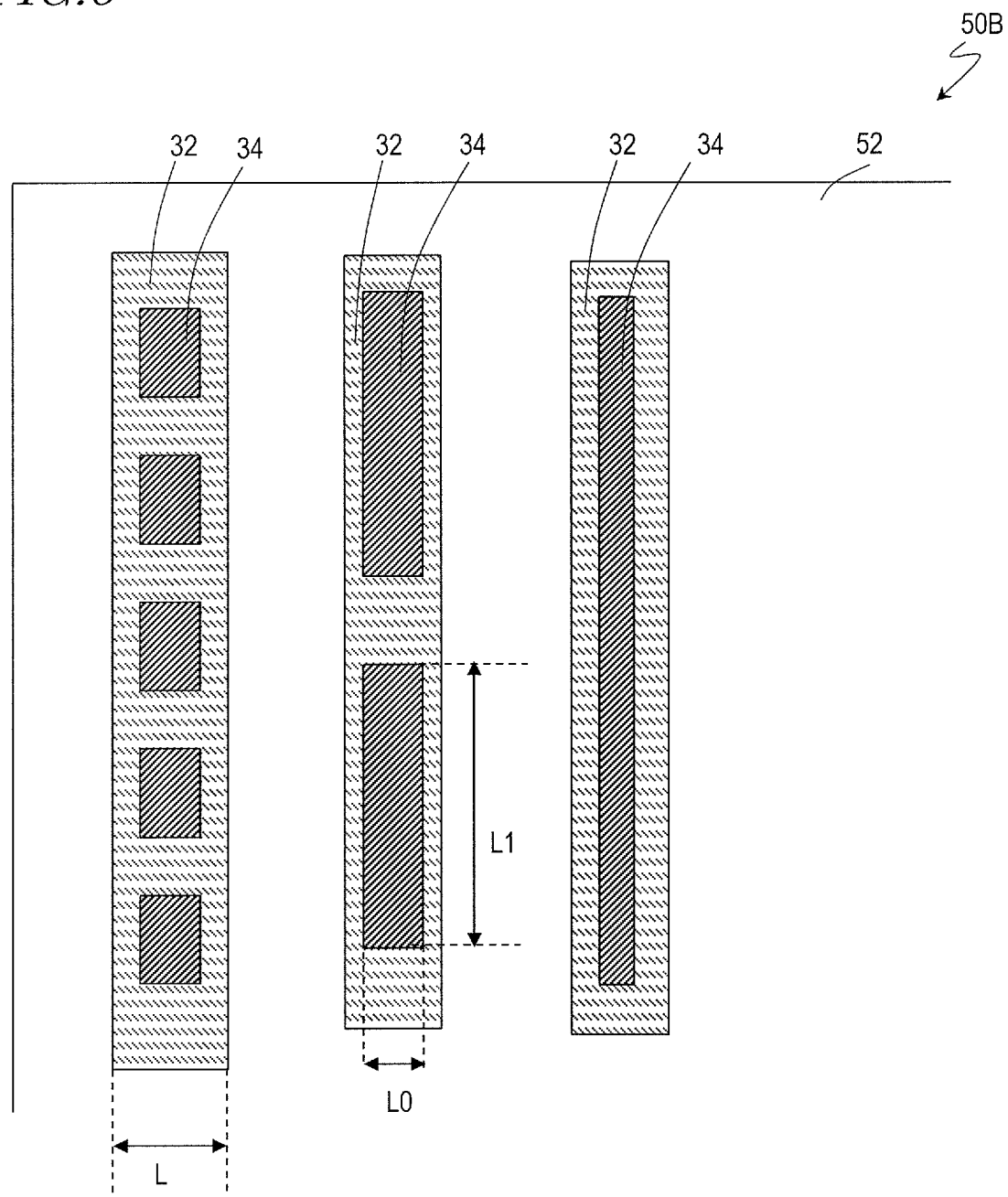
FIG. 6 is an example of a schematic plan view of the printed material 50B viewed in the normal direction.

The configurations of printing intaglios 100B of Embodiment 2 of the present invention and printed materials 50B produced from the printing intaglios 100B are described with reference to FIG. 5 and FIG. 6. FIGS. 5(a) and 5(b) are each an example of a schematic cross-sectional view of the printing intaglio 100B of Embodiment 2 of the present invention. FIGS. 5(c) and 5(d) are schematic cross-sectional views of printed materials 50B produced using the printing intaglios 100B shown in FIGS. 5(a) and 5(b), respectively. FIG. 6 is an example of a schematic plan view of the printed material 50B viewed in the normal direction. In the following paragraphs, the differences of the printing intaglio of the present embodiment from the printing intaglio of Embodiment 1 are mainly described.

As shown in FIGS. 5(a) and 5(b), in the printing intaglio 100B, at least one of the plurality of first recessed portions 12 which has a plurality of minute recessed portions 16p inside the first recessed portion 12 include at least one first recessed portion 12 which has at least one second recessed portion 14 inside the first recessed portion 12. The plurality of minute recessed portions 16p includes a plurality of minute recessed portions 16p provided inside at least one second recessed portion 14.

That is, the printing intaglio 100B is different from the printing intaglio of Embodiment 1 in that the printing intaglio 100B has a first recessed portion 12 which has at least one second recessed portion 14 inside the first recessed portion 12. Each of the second recessed portions 14 is provided inside any of the plurality of first recessed portions 12. Each of the second recessed portions 14 is provided at, for example, the bottom surface of any of the plurality of first recessed portions 12. Each of the first recessed portions 12 may independently have a single second recessed portion 14 inside the first recessed portion 12, have a plurality of second recessed portions 14 inside the first recessed portion 12, or not have a second recessed portion 14 inside the first recessed portion 12. The plurality of minute recessed portions 16p provided inside a first recessed portion 12 may be provided inside at least one second recessed portion 14 or may be provided outside at least one second recessed portion 14.

For example, in the example shown in FIG. 5(a), some of the plurality of first recessed portions 12 have a single second recessed portion 14 inside the first recessed portion 12 and have a plurality of minute recessed portions 16p at the bottom surface of the second recessed portion 14. Others of the plurality of first recessed portions 12 do not have a second recessed portion 14 inside the first recessed portion 12. For example, in the example shown in FIG. 5(b), some of the plurality of first recessed portions 12 have a plurality of second recessed portions 14 inside the first recessed portion 12.

The method for producing a printed material using the printing intaglio 100B may be the same as that which has previously been described with reference to FIGS. 1(b) and 1(c).

The printed materials 50B of FIGS. 5(c) and 5(d) are printed materials 50B produced using the printing intaglios 100B shown in FIGS. 5(a) and 5(b), respectively.

The printed material 50B produced using the printing intaglio 100B includes a printing layer 30 formed of a printing ink on a substrate 52. The printing layer 30 includes a plurality of island portions 32. The plurality of island portions 32 constitute a pattern printed on the substrate 52. At least one of the plurality of island portions 32 has a plurality of minute raised portions 36p at its surface. At least one of the plurality of island portions 32 which has a plurality of minute raised portions 36p at its surface includes at least one island portion 32 which has at least one raised portion 34 on the island portion 32. The plurality of minute raised portions 36p include a plurality of minute raised portions 36p formed at the surface of at least one raised portion 34.

The island portions 32, the raised portions 34 and the minute raised portions 36p of the printing layer 30 are formed corresponding to the first recessed portions 12, the second recessed portions 14 and the minute recessed portions 16p, respectively, at the surface of the printing intaglio 100B. That is, the island portions 32, the raised portions 34 and the minute raised portions 36p of the printing layer are formed by raised portions which are inverse of the first recessed portions 12, the second recessed portions 14 and the minute recessed portions 16p, respectively, at the surface of the printing intaglio 100B.

For example, in the example shown in FIG. 5(c), some of the plurality of island portions 32 has a single raised portion 34 on an island portion 32 and has a plurality of minute raised portions 36p at the surface of the raised portion 34. Others of the island portions 32 do not have a raised portion 34 on the island portion 32. For example, in the example shown in FIG. 5(d), some of the plurality of island portions 32 has a plurality of raised portions 34 on the island portion 32. As shown in FIG. 6, the shape of the island portion 32 and the shape of the plurality of raised portions 34 may be arbitrary. The width of each of the plurality of island portions 32, L, is for example 10 μm to 100 μm. The width of each of the plurality of raised portions 34, L0, is for example 5 μm to 50 μm. The length (the length perpendicular to width L0) of each of the plurality of raised portions 34, L1, is for example 5 μm to 50 μm.

Since the printed material 50B has the plurality of minute raised portions 36p at the surface of the island portions 32 of the printing layer 30, the printed material can be authenticated based on the presence/absence of the plurality of minute raised portions 36p. As a result, counterfeiting of the printed material 50B can be deterred. For example, if the printed material 50B is copied on a copier, the physical structure of the plurality of minute raised portions 36p and its optical characteristics cannot be reproduced.

Since at least one of the plurality of first recessed portions 12 of the printing intaglio 100B has a plurality of minute recessed portions 16p inside the first recessed portion 12, the printing layer 30 and the plurality of minute raised portions 36p can be formed in the same step. Further, misalignment between the island portions 32 and the plurality of minute raised portions 36p would not occur. The printing intaglio 100B is capable of producing a printed material which can be easily authenticated and which is capable of deterring counterfeiting while suppressing decrease of the production yield.

Since the printed material 50B includes island portions 32 which have at least one raised portion 34 on the island portions 32, the printed material can be authenticated more easily. That is, when within the surface of the island portions 32 only the surface of the raised portions 34 has the minute raised portions 36p, the surface of the raised portions 34 suppresses surface reflection more than the other part of the surface of the island portions 32. Since the surface of a single island portion 32 includes regions of different reflectances, the presence/absence of the minute raised portions 36p can be easily distinguished. Thus, the printed material can be more easily authenticated.

Figure 7:
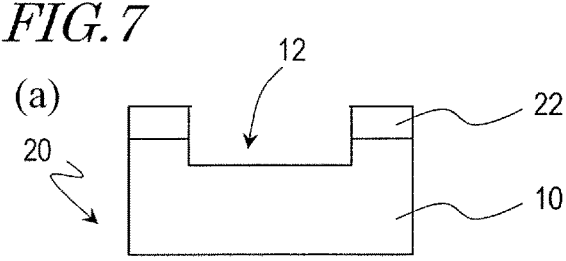
FIGS. 7(a) to 7(f) are schematic cross-sectional views for illustration of a method for manufacturing the printing intaglio 100B.
Figure 7:
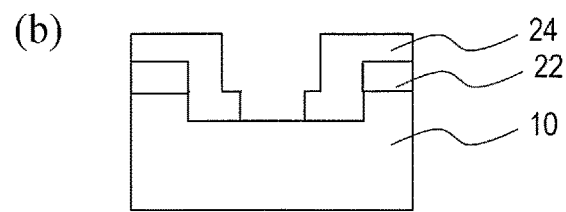
Figure 7:
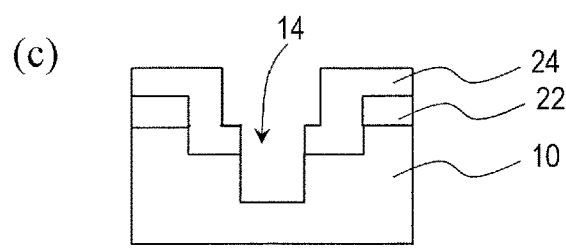
Figure 7:
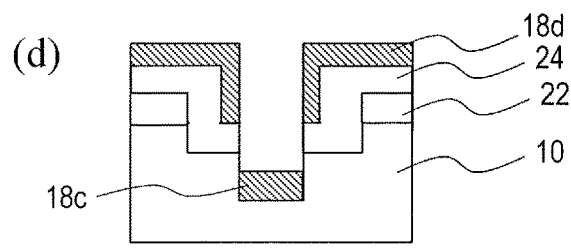
Figure 7:
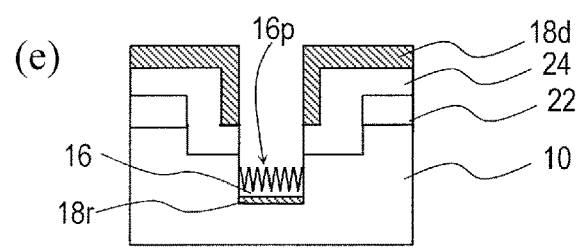
Figure 7:
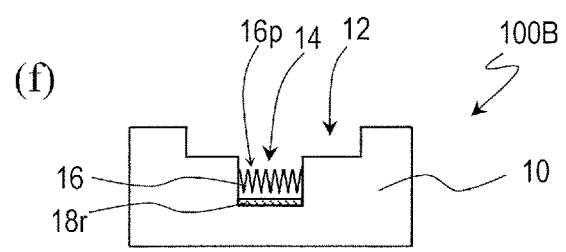

A method for manufacturing the printing intaglio 100B is described with reference to FIG. 7. FIGS. 7(a) to 7(f) are schematic cross-sectional views for illustration of the method for manufacturing the printing intaglio 100B. The differences from the manufacturing method of the printing intaglio 100A are mainly described.

First, as shown in FIG. 7(a), a printing base 20 is obtained by forming a plurality of first recessed portions 12 at the surface of a base 10. According to the method which has previously been described with reference to FIGS. 3(a) and 3(b), an etching treatment is performed on the base 10 using a patterned first resist layer 22 as an etching mask, whereby a plurality of first recessed portions 12 are formed at the surface of the base 10.

Likewise, as shown in FIGS. 7(b) and 7(c), second recessed portions 14 are formed in the first recessed portions 12. Specifically, firstly, a resist film is formed in the first recessed portions 12 and on the patterned first resist layer 22, and the resist film is photolithographically patterned, whereby a second resist layer 24 is obtained (FIG. 7(b)). An etching treatment is performed on the base 10 using the patterned second resist layer 24 as an etching mask. By this etching treatment, at least one second recessed portion 14 is formed in the first recessed portions 12.

Then, as shown in FIG. 7(d), an aluminum film 18 is formed by the same method as that which has previously been described with reference to FIG. 3(c). An inorganic material layer may further be formed under the aluminum film 18. Part of the aluminum film 18 which is formed inside the second recessed portion 14 is referred to as "aluminum film 18c". Part of the aluminum film 18 which is formed outside the second recessed portion 14 is referred to as "aluminum film 18d".

According to the same method as that which has previously been described with reference to FIG. 4, the step of anodizing the surface of the aluminum film 18c and the step of etching the porous alumina layer 16 are repeated, whereby a porous alumina layer 16 which has an inverted moth-eye structure is formed (FIG. 7(e)).

Thereafter, as shown in FIG. 7(f), the patterned first resist layer 22 and the patterned second resist layer 24 are removed. In this step, the aluminum film 18d formed on the patterned second resist layer 24, i.e., part 18d of the aluminum film 18 which is formed outside the second recessed portion 14, is removed.

Through the above-described process, the printing intaglio 100B shown in FIG. 7(f) is obtained.

As described above, a printing intaglio of an embodiment of the present invention is suitably used for production of a printed material which is capable of deterring counterfeiting and which can be easily authenticated. A printed material of an embodiment of the present invention may include various printed materials such as, for example, banknotes, securities, personal identification certificates (e.g., passport), credit cards, and warranty cards for brand name products and treasures (e.g., watches and gems). Patterns printed by a printing intaglio of an embodiment of the present invention may be, for example, figures, pictures, designs, lines, shapes, characters, symbols, etc. For example, a printing intaglio for printing of alphabetical characters and numerals can be used for identification numbers (identification marks) which are to be printed on aforementioned various printed materials, and advantageously can be applicable for various purposes.

A substrate on which a printing layer is to be formed is not limited to paper but may be formed of a resin. If at least part of the substrate on which a printing layer is to be formed is made of a transparent resin film, a printing ink including a photocurable resin can be readily cured.

In the printed material production method which has previously been described with reference to FIGS. 1(b) and 1(c), the printing ink 30' further includes, for example, a pigment (coloring pigment) and/or dye. By appropriately selecting the pigment and/or dye, a printing layer of an arbitrary color can be formed. A black printing layer is advantageous in that the difference in surface reflectance of the printing layer is easily distinguishable by eyes. In forming the black printing layer, a printing ink including, for example, carbon black is used.

When a printed material is produced using a printing intaglio of the present invention, unevenness in the minute raised portions 36p at the surface of the produced printed material (problem 3) and/or failure in formation of some of the minute raised portions 36p (problem 4) can occur. These problems can occur when the particle diameter of the pigment included in the printing ink 30' is close to the two-dimensional size of the plurality of minute recessed portions 16p at the surface of the printing intaglio. If particles of the pigment included in the printing ink 30' are caught in the openings of the minute recessed portions 16p, there is a probability that the UV-curable resin included in the printing ink 30' will not be sufficiently supplied into the minute recessed portions 16p. In such a case, the minute raised portions 36p formed at the surface of the printing layer deviate from the shape of raised portions which are inverse of the minute recessed portions 16p of the printing intaglio.

For example, the above-described problems can be solved by the following printed material production methods (1) to (3). The differences from the printed material production method which has previously been described with reference to FIGS. 1(b) and 1(c) are mainly described. FIGS. 8(a) to 8(d) are schematic diagrams for illustration of the printed material production method (3).

(1) The pigment used includes a sufficiently large amount of particles whose particle diameter is smaller than the two-dimensional size of the plurality of minute recessed portions 16p at the surface of the printing intaglio. For example, a pigment whose average particle diameter is smaller than the two-dimensional size of the plurality of minute recessed portions 16p can be used, although it depends on the particle size distribution of the pigment. Using a pigment whose average particle diameter is not more than ¼ of the two-dimensional size of the plurality of minute recessed portions 16p is more preferred. When such a pigment is used, occurrence of the above-described problem 3 and/or problem 4 can be suppressed. That is, even if particles of the pigment included in the printing ink 30' reside in the minute recessed portions 16p, the UV-curable resin included in the printing ink 30' can be sufficiently supplied to the tip ends of the minute recessed portions 16p.

(2) The pigment used includes a sufficiently large amount of particles whose particle diameter is greater than the two-dimensional size of the plurality of minute recessed portions 16p at the surface of the printing intaglio. For example, a pigment whose average particle diameter is greater than the two-dimensional size of the plurality of minute recessed portions 16p can be used, although it depends on the particle size distribution of the pigment. When such a pigment is used, occurrence of the above-described problem 3 and/or problem 4 can be suppressed. That is, particles of the pigment included in the printing ink 30' would not enter the minute recessed portions 16p, and therefore, the UV-curable resin included in the printing ink 30' can be sufficiently supplied to the tip ends of the minute recessed portions 16p.

(3) See FIGS. 8(a) to 8(d). The printing ink includes the first ink 31a' and the second ink 31b'. The first ink 31a' includes a pigment. The second ink 31b' includes a UV-curable resin but does not include a pigment. By irradiating the first ink 31a' and the second ink 31b' with light (e.g., ultraviolet light), the first ink 31a' and the second ink 31b' are cured. In this step, the first ink 31a' is applied between the substrate 52 and the second ink 31b'. According to the production method (3), the second ink 31b' that does not include a pigment is mainly applied into the minute recessed portions 16p, occurrence of the above-described problem 3 and/or problem 4 can be suppressed.

For example, as shown in FIG. 8(a), firstly, the second ink 31b' is applied into the first recessed portions 12 of the printing intaglio 100A. Thereafter, as shown in FIG. 8(b), the first ink 31a' is applied on the second ink 31b'. Since, here, the second ink 31b' and the first ink 31a' are not cured yet, the second ink 31b' and the first ink 31a' can be intermixed with each other. However, the second ink 31b' is mainly applied into the minute recessed portions 16p.

The first ink 31a' and the second ink 31b' may be simultaneously applied into the first recessed portions 12. The simultaneous application can be realized by, for example, a co-extrusion method. The method may be configured such that the second ink 31b' is mainly applied to the bottom surface of the first recessed portions 12, i.e., on the minute recessed portions 16p side.

Then, as shown in FIG. 8(c), the first ink 31a' and the second ink 31b' are irradiated with ultraviolet light (UV) while the printing intaglio 100A is pressed against the substrate 52, whereby the first ink 31a' and the second ink 31b' are cured to form a printing layer 30 on the substrate 52. In this way, a printed material 50A is obtained (FIG. 8(d)). The printing layer 30 formed according to the printed material production method (3) can include, for example, a lower layer portion 31a which mainly includes the first ink and an upper layer portion 31b which mainly includes the second ink. No clear interface is formed between the upper layer portion 31b and the lower layer portion 31a.

Figure 8:
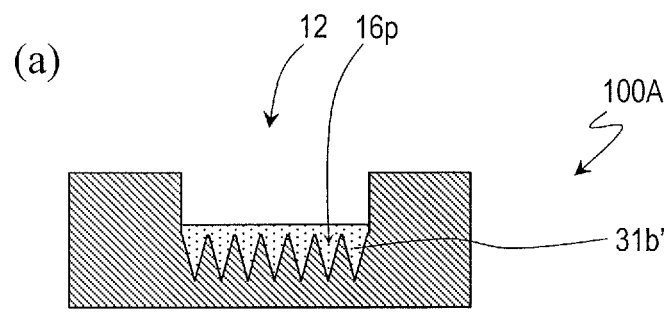
FIGS. 8(a) to 8(d) are schematic cross-sectional views for illustration of a printed material production method of an embodiment of the present invention.
Figure 8:
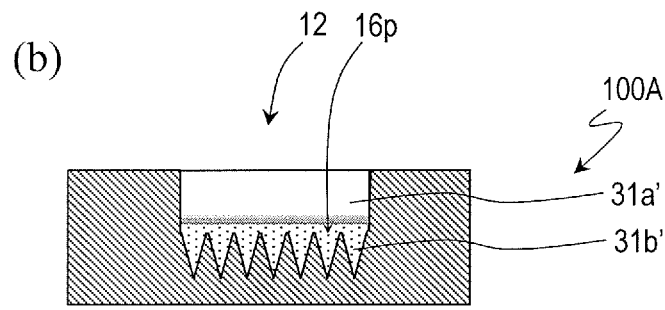
Figure 8:
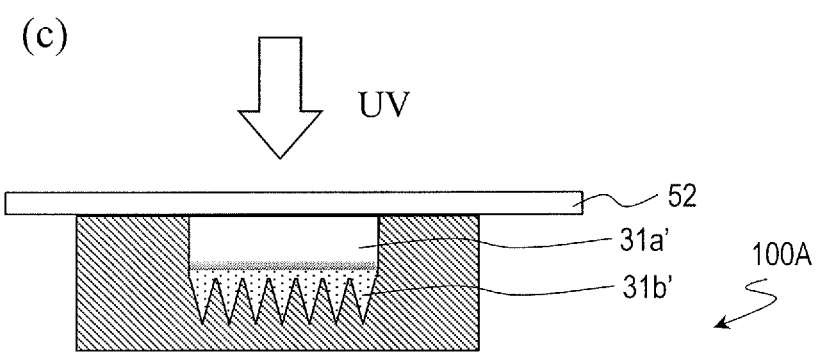
Figure 8:
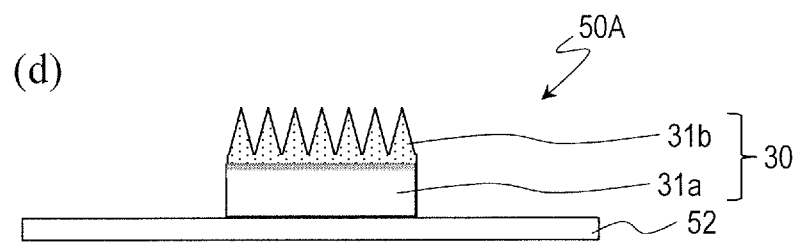

In FIG. 8, a method for producing a printed material using the printing intaglio 100A is illustrated although, as a matter of course, the printing intaglio 100B may be used.

In the printed material production method (3), using the pigment of the above-described production method (2) is more preferred. That is, the pigment included in the first ink 31a' preferably has a greater average particle diameter than the two-dimensional size of the plurality of minute recessed portions 16p.

In the printed material production method (3), the second ink 31b' may further include a fluorine-containing monomer (e.g., fluorine-containing acrylic resin). In this case, the produced printed material includes a large amount of fluorine element in the minute raised portions 36p at the surface of the printing layer.

The produced printed material is capable of more effectively deterring counterfeiting and can be more easily authenticated. A portion of the surface of the printing layer 30 which has minute raised portions 36p has better water repellency and better oil repellency than the other portion of the surface of the printing layer 30 which does not have minute raised portions 36p. The printed material can be authenticated based not only on the difference in reflectance of the printing layer but also on the difference in water repellency and/or oil repellency of the surface of the printing layer. When the printed material is copied, the water repellency and/or oil repellency of the surface cannot be reproduced. Therefore, counterfeiting can be suppressed.

Since a portion of the surface of the printing layer 30 which has minute raised portions 36p has better water repellency and better oil repellency, it has such an effect that grease, such as fingerprint, adhered to the surface can be easily wiped away.

The first ink 31a' includes, for example, 10 wt % transparent resin monomer (manufactured by DAIKIN INDUSTRIES, LTD., product name: OPTOOL DAC), 84 wt % diluent (manufactured by KJ Chemicals Corporation, product name: ACMO), 3 wt % carbon black (manufactured by Mitsubishi Chemical Corporation, product name: HCF (#2650), average particle diameter: 13 nm), and 3 wt % transparent particles (polystyrene resin, manufactured by Corefront Corporation, product name: micromer 01-00-124, average particle diameter: 12 μm). These resins were mixed together by a ball mill, whereby the first ink 31a' was obtained.

The second ink 31b' includes, for example, 99 wt % transparent resin (manufactured by Toyo Gosei Co., Ltd, product name: PAK-01) and 1 wt % initiator (photopolymerization initiator (e.g., manufactured by BASF, product name: IRGACURE)).

INDUSTRIAL APPLICABILITY

A printing intaglio of the present invention is suitably used for production of a printed material which is required to be capable of deterring counterfeiting and that can be easily authenticated such as, for example, banknotes, securities, personal identification certificates (e.g., passport), credit cards, and warranty cards for brand name products and treasures (e.g., watches and gems).

REFERENCE SIGNS LIST 10 base
12 first recessed portion
14 second recessed portion
16 porous alumina layer
16p minute recessed portion
18, 18a, 18b aluminum film
20 printing base
30 printing layer
30' printing ink
32 island portion
34 raised portion
36p minute raised portion
42 first resist layer
44 second resist layer
50A, 50B printed material
52 substrate
100A, 100B printing intaglio

The invention claimed is:

1. A printing intaglio for use in intaglio printing,
the printing intaglio having a surface which has a plurality of first recessed portions that form a pattern to be printed,
wherein at least one of the plurality of first recessed portions has a plurality of minute recessed portions inside the first recessed portion, and
when viewed in a direction normal to the surface of the printing intaglio, a two-dimensional size of the plurality of minute recessed portions is equal to or more than 10 nm and less than 500 nm.

2. The printing intaglio of claim 1, wherein the at least one first recessed portion includes a porous alumina layer, and the porous alumina layer has the plurality of minute recessed portions.

3. The printing intaglio of claim 1, wherein the at least one first recessed portion includes at least one first recessed portion which has at least one second recessed portion inside the first recessed portion, and the plurality of minute recessed portions include a plurality of minute recessed portions provided inside the at least one second recessed portion.

4. A method for producing a printed material using the printing intaglio as set forth in claim 1, the method comprising the steps of:
providing the printing intaglio;
providing a substrate;
applying a printing ink which includes a photocurable resin between the printing intaglio and a surface of the substrate and irradiating the printing ink with light, thereby curing the printing ink; and
separating the printing intaglio from a printing layer formed by the cured printing ink.

5. The method of claim 4, wherein the printing ink further includes a pigment whose average particle diameter is greater than a two-dimensional size of the plurality of minute recessed portions of the printing intaglio.

6. The method of claim 4, wherein the printing ink further includes a pigment whose average particle diameter is smaller than a two-dimensional size of the plurality of minute recessed portions of the printing intaglio.

7. The method of claim 4, wherein the printing ink includes a first ink and a second ink, the first ink including a pigment, the second ink including the photocurable resin but not including a pigment, and the first ink is applied between the substrate and the second ink.

8. A method for manufacturing a printing intaglio, comprising the steps of:
(a) providing a printing base which has a plurality of first recessed portions at its surface;
(b) forming an aluminum film on the printing base;
(c) after (b), anodizing a surface of the aluminum film, thereby forming a porous alumina layer which has a plurality of minute recessed portions;
(d) after (c), bringing the porous alumina layer into contact with an etching solution, thereby enlarging the plurality of minute recessed portions of the porous alumina layer; and
(e) removing part of the aluminum film formed outside the plurality of first recessed portions.

9. The method of claim 8, wherein the step (e) is performed after the steps (c) and (d).

10. The method of claim 8, wherein the step (a) comprises the steps of
(a1) providing a base,
(a2) forming a first resist layer on the base,
(a3) photolithographically patterning the first resist layer, and
(a4) performing an etching treatment on the base using the patterned first resist layer as a mask, and
by the etching treatment in the step (a4), the plurality of first recessed portions are formed at the surface of the printing base.

11. The method of claim 10, wherein the step (e) comprises the step of (e1) removing the first resist layer patterned in the step (a3).

12. The method of claim 8, wherein
in the step (a), at least one of the plurality of first recessed portions has at least one second recessed portion inside the first recessed portion, and
the step (e) comprises the step of (e2) removing part of the aluminum film formed in a region outside the at least one second recessed portion.

13. The method of claim 12, wherein the step (a) comprises the steps of
- (a5) forming a second resist layer on the printing base,
- (a6) photolithographically patterning the second resist layer, and
- (a7) performing an etching treatment on the printing base using the patterned second resist layer as a mask, and
- by the etching treatment in the step (a7), the at least one second recessed portion is formed at the surface of the printing base.

14. The method of claim 13, wherein the step (e) comprises the step of (e3) removing the second resist layer patterned in the step (a7).

15. The method of claim 13, wherein the step (a5) is performed after the step (a4) and includes the step of forming the second resist layer on the first resist layer.

* * * * *